United States Patent [19]

Davis et al.

[11] Patent Number: 5,210,865
[45] Date of Patent: May 11, 1993

[54] TRANSFERRING DATA BETWEEN STORAGE MEDIA WHILE MAINTAINING HOST PROCESSOR ACCESS FOR I/O OPERATIONS

[75] Inventors: Scott H. Davis, Merrimack; William L. Goleman, Nashua; David W. Thiel, Amherst, all of N.H.

[73] Assignee: Digital Equipment Corporation, Maynard, Mass.

[21] Appl. No.: 925,307

[22] Filed: Aug. 4, 1992

Related U.S. Application Data

[63] Continuation of Ser. No. 374,528, Jun. 30, 1989, abandoned.

[51] Int. Cl.⁵ .................. G06F 13/00; G06F 11/16
[52] U.S. Cl. .................. 395/575; 364/DIG. 1
[58] Field of Search ... 364/200 MS File, 900 MS File; 395/575 MS

[56] References Cited

U.S. PATENT DOCUMENTS

| | | | |
|---|---|---|---|
| 3,544,777 | 12/1970 | Winkler | 371/10.1 |
| 3,668,644 | 6/1972 | Looschen | 364/200 |
| 4,199,810 | 4/1980 | Gunckel, II, et al. | 395/425 |
| 4,432,057 | 2/1984 | Daniell et al. | 364/300 |
| 4,467,421 | 8/1984 | White | 395/425 |
| 4,476,526 | 10/1984 | Dodd | 395/425 |
| 4,503,534 | 3/1985 | Budde et al. | 371/11.3 |
| 4,584,681 | 8/1986 | Singh et al. | 371/10.1 |
| 4,600,990 | 7/1986 | Gershenson et al. | 364/200 |
| 4,602,368 | 7/1986 | Circello et al. | 395/425 |
| 4,603,406 | 7/1986 | Miyazaki et al. | 371/10.1 |
| 4,608,687 | 8/1986 | Dutton | 371/10.2 |
| 4,608,688 | 8/1986 | Hansen et al. | 364/200 |
| 4,616,312 | 10/1986 | Uebel | 395/575 |
| 4,617,475 | 10/1986 | Reinschmidt | 371/36 |
| 4,636,946 | 1/1987 | Hartung et al. | 364/200 |
| 4,638,424 | 1/1987 | Beglin et al. | 364/200 |
| 4,654,819 | 3/1987 | Stiffler et al. | 364/200 |
| 4,686,620 | 8/1987 | Ng | 395/600 |
| 4,688,219 | 8/1987 | Takemae | 371/10.3 |
| 4,710,870 | 12/1987 | Blackwell et al. | 364/200 |
| 4,747,038 | 5/1988 | Bradley et al. | 364/200 |
| 4,750,106 | 6/1988 | Aiken et al. | 364/200 |
| 4,751,639 | 6/1988 | Corcoran | 395/575 |
| 4,755,928 | 7/1988 | Johnson et al. | 364/200 |
| 4,768,193 | 8/1988 | Takemae | 371/10.3 |
| 4,771,375 | 9/1988 | Beglin et al. | 364/200 |
| 4,805,095 | 2/1989 | Armstrong | 395/775 |
| 4,814,971 | 3/1989 | Thatte | 395/575 |
| 4,819,154 | 4/1989 | Stiffler et al. | 395/575 |
| 4,916,605 | 4/1990 | Beardsly | 395/425 |
| 4,959,774 | 9/1990 | Davis | 364/200 |
| 5,060,185 | 10/1991 | Naito et al. | 395/600 |
| 5,089,958 | 2/1992 | Horton et al. | 395/575 |

FOREIGN PATENT DOCUMENTS

| | | |
|---|---|---|
| 026980 | 9/1980 | European Pat. Off. . |
| 303856 | 7/1988 | European Pat. Off. . |
| 59-201297(A) | 11/1984 | Japan . |
| 2188177 | 11/1984 | United Kingdom . |

OTHER PUBLICATIONS

Research Disclosures No. 296, Dec. 1988, New York, N.Y., US; RD29647 (Anonymous): "Data Integrity During Mirror Synchronisation".
Haskin, "Virtual Disk Casts a Long Shadow" (Aug. 1988), pp. 49-52.

*Primary Examiner*—Joseph L. Dixon
*Assistant Examiner*—Reba I. Elmore
*Attorney, Agent, or Firm*—Fish & Richardson

[57] ABSTRACT

A system and method for transferring data from a first storage medium to a second storage medium, each of the storage media being divided into corresponding data blocks, the method comprising steps of: (a) reading data stored in a first data block in the first storage medium, the first data block initially constituting a current data block; (b) comparing data read in the current data block to data stored in a corresponding data block in the second storage medium; (c) if the data compared in step b are identical, reading data stored in a different data block in the first storage medium, the different data block becoming the current data block, and returning to step b; (d) modifying the data stored in one of the storage media such that the data in the current data block is identical to the corresponding data in the second storage medium; and (e) rereading the data in the current data block and returning to step b.

23 Claims, 6 Drawing Sheets

WRITE COMMAND MESSAGE FORMAT

| COMMAND REFERENCE NUMBER |||
| --- | --- | --- |
| RESERVED | UNIT NUMBER ||
| MODIFIERS | RESERVED | OPCODE |
| BYTE COUNT |||
| BUFFER DESCRIPTOR |||
| LOGICAL BLOCK NUMBER |||

FIG. 2A

READ COMMAND MESSAGE FORMAT

| COMMAND REFERENCE NUMBER |||
| --- | --- | --- |
| RESERVED | UNIT NUMBER ||
| MODIFIERS | RESERVED | OPCODE |
| BYTE COUNT |||
| BUFFER DESCRIPTOR |||
| LOGICAL BLOCK NUMBER |||

FIG. 2B

WRITE END MESSAGE FORMAT

| COMMAND REFERENCE NUMBER ||| 
|---|---|---|
| SEQUENCE NUMBER || UNIT NUMBER |
| STATUS | FLAGS | END CODE |
| BYTE COUNT |||
| UNDEFINED |||
| FIRST BAD BLOCK |||

FIG. 3A

READ END MESSAGE FORMAT

| COMMAND REFERENCE NUMBER |||
|---|---|---|
| SEQUENCE NUMBER || UNIT NUMBER |
| STATUS | FLAGS | END CODE |
| BYTE COUNT |||
| UNDEFINED |||
| FIRST BAD BLOCK |||

FIG. 3B

HOST COMPARE COMMAND FORMAT

| COMMAND REFERENCE NUMBER ||||
|:-:|:-:|:-:|:-:|
| RESERVED || UNIT NUMBER ||
| MODIFIERS | RESERVED || OPCODE |
| BYTE COUNT ||||
| BUFFER DESCRIPTOR ||||
| LOGICAL BLOCK NUMBER ||||

FIG. 4A

HOST COMPARE END MESSAGE FORMAT

| COMMAND REFERENCE NUMBER |||
|:-:|:-:|:-:|
| SEQUENCE NUMBER || UNIT NUMBER |
| STATUS | FLAGS | END CODE |
| BYTE COUNT |||
| UNDEFINED |||
| FIRST BAD BLOCK |||

FIG. 4B

TRANSFERRING DATA BETWEEN STORAGE MEDIA WHILE MAINTAINING HOST PROCESSOR ACCESS FOR I/O OPERATIONS

This application is a file wrapper continuation of U.S. application Ser. No. 07/374,528, filed Jun. 30, 1989, now abandoned.

RELATED APPLICATIONS

This application is related to the following applications, all of which are filed concurrently herewith, and each of which is incorporated herein by reference: U.S. patent application Ser. No. 07/374,353, in the name of Scott H. Davis, William L. Goleman, David W. Thiel, Robert G. Bean and James A Zahrobsky, and entitled Transferring Data In A Digital Data Processing System; U.S. patent application Ser. No. 07/374,490, in the name of Scott H. Davis, William L. Goleman and David W. Thiel, and entitled Digital Data Management System; and U.S. patent application Ser. No. 07/374,251, in the name of Scott H. Davis, William L. Goleman and David W. Thiel, Robert G. Bean and James A Zahrobsky, and entitled Data Storage Device For A Digital Data Processing System.

BACKGROUND OF THE INVENTION

This invention relates to a device for transferring digital data between two storage devices in a digital data processing system. The preferred embodiment is described in connection with a system for establishing and maintaining one or more duplicate or "shadow" copies of stored data to thereby improve the availability of the stored data.

A typical digital computer system includes one or more mass storage subsystems for storing data (which may include program instructions) to be processed. In typical mass storage subsystems, the data is actually stored on disks. Disks are divided into a plurality of tracks, at selected radial distances from the center, and sectors, defining particular angular regions across each track, with each track and set of one or more sectors comprising a block, in which data is stored.

Since stored data may be unintentionally corrupted or destroyed, systems have been developed that create multiple copies of stored data, usually on separate storage devices, so that if the data on one of the copies is damaged, it can be recovered from one or more of the remaining copies. Such multiple copies are known as a "shadow set." In a shadow set, typically data that is stored in particular blocks on one member of the shadow set is the same as data stored in corresponding blocks on the other members of the shadow set. It is usually desirable to permit multiple host processors to simultaneously access (i.e., in parallel) the shadow set for read and write type requests ("I/O" requests).

A new storage device or "new member" is occasionally added to the shadow set. For example, it may be desirable to increase the number of shadow set members to improve the data availability or it may be necessary to replace a shadow set member that was damaged. Because all shadow set members contain the same data, when adding a new member, all of the data stored on the active members is copied to the new member.

SUMMARY OF THE INVENTION

The invention generally features a system and method for transferring data from a first storage medium to a second storage medium and is used in the preferred embodiment to copy data from an active member of a shadow set to a new shadow set member. In the preferred embodiment, the first storage medium is available to one or more hosts for I/O operations, and each of the storage media are divided into corresponding data blocks, the method generally including the steps of: (a) reading data stored in a first data block in the first storage medium, the first data block initially constituting a current data block; (b) comparing data read in the current data block to data stored in a corresponding data block in the second storage medium; (c) if the data compared in step b are identical, reading data stored in a different data block in the first storage medium, the different data block becoming the current data block, and returning to step b; (d) if the data compared in step b are not identical, transferring the data stored in the current data block to a corresponding data block in the second storage medium; and (e) rereading the data in the current data block and returning to step b.

In the preferred embodiment, the different data block is a data block adjacent to the current data block. Each data block in the first storage medium is compared to a corresponding data block in the second storage medium. Each of the storage media may be directly accessed by one or more host processors. The storage media may be disk storage devices.

The invention allows data to be copied from one storage media to a second storage media without interrupting I/O operations from one or more hosts to the shadow set. Therefore a shadowing system can be maintained that provides maximum availability to data with no interruption to routine I/O operations while providing consistent and correct results.

Other advantages and features of the invention will be apparent from the following detailed description of the invention and the appended claims.

DESCRIPTION OF THE PREFERRED EMBODIMENTS DRAWINGS

We first briefly describe the drawings.

FIGS. 2A-2B, 3A-3B and 4A-4B are data structures used with the invention.

STRUCTURE AND OPERATION

Figure 1:
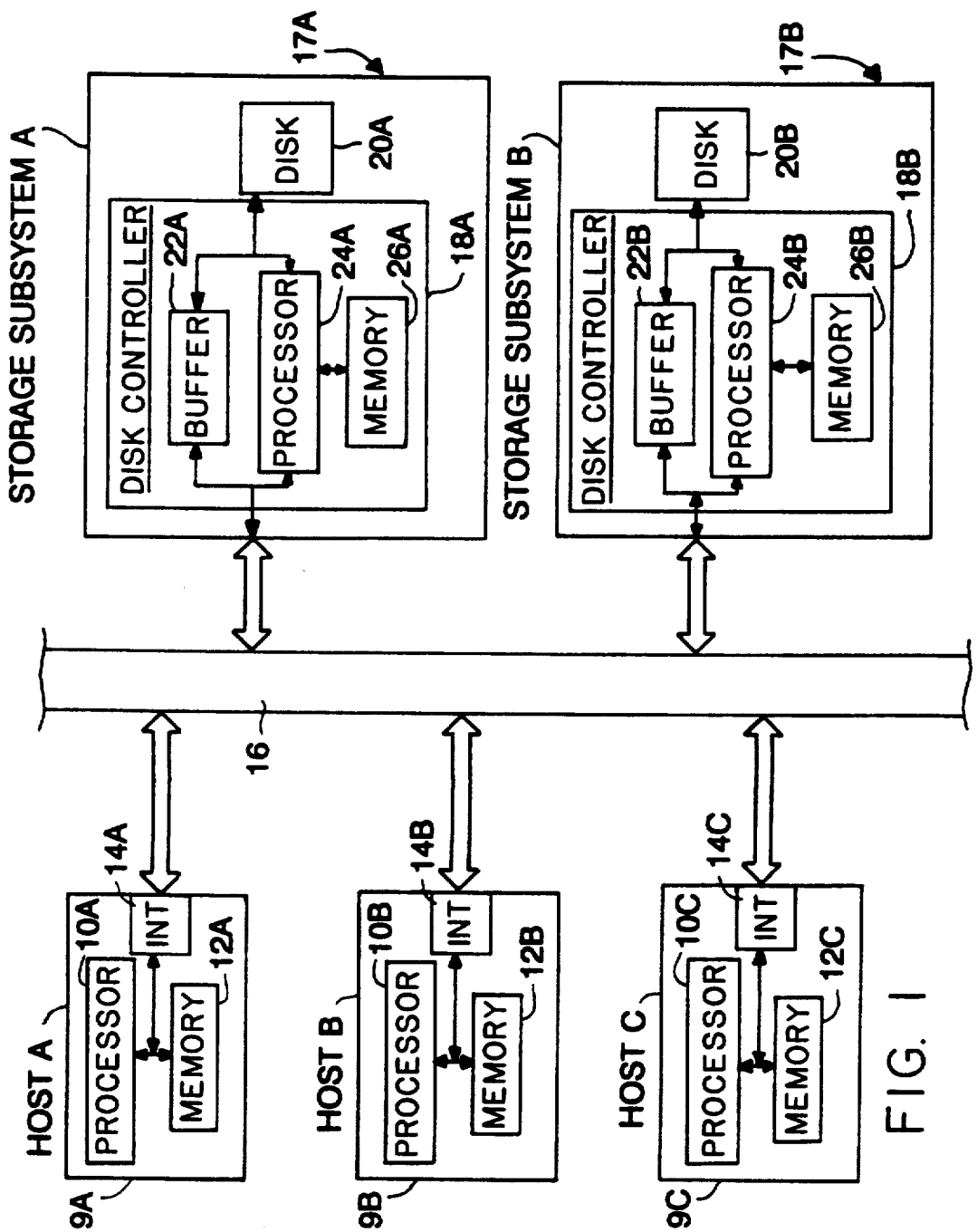
FIG. 1 is a shadow set storage system according to the present invention.

Referring to FIG. 1, a shadowing system utilizing the invention includes a plurality of hosts 9A, 9B, and 9C (hereinafter generally identified with reference numeral 9), which include processors 10A, 10B, and 10 C (hereinafter generally identified with reference numeral 10), memories 12A, 12B, and 12C (hereinafter generally identified with reference numeral 12) (including buffer storage) and a communications interfaces 14A, 14B, and 14C (hereinafter generally identified with reference numeral 14). Each host 9 is each directly connected through a communications medium 16 (e.g., by a virtual circuit) to at least two storage subsystems 17A and 17B (hereinafter generally identified with reference numeral 17).

Storage subsystems 17 include disk controllers 18A and 18B (hereinafter generally identified with reference numeral 18) that control I/O requests to one or more disks 20A and 20B (hereinafter generally identified with reference numeral 20), which form the members of the shadow set. Disk controllers 18 include buffers 22A and 22B (hereinafter generally identified with reference numeral 22), processors 24A and 24B (hereinafter generally identified with reference numeral 24), memories 26A and 26B (hereinafter generally identified with reference numeral 26), which are, e.g., volatile memories. Processor 24 receives I/O requests from host 9 and controls reads from and writes to disk 20. Buffer 22 temporarily stores data received in connection with a write command before the data are written to disk 20. Buffer 22 also stores data read from a disk 20 before the data are transmitted to host 9 in response to a read command. Processor 24 stores various types of information in memory 26. Each host 9 will store, in its memory 12, a table that includes information about the system that the hosts 9 need to perform many operations. For example, hosts 9 will perform read and write operations to storage subsystems 17 and must know which storage subsystems are available for use, what disks are stored in the subsystems, etc. As will be described in greater detail below, the hosts 9 will slightly alter the procedure for read and write operations if data is being transferred from one shadow set member to another. Therefore, the table will store status information regarding any ongoing operations. The table also contains other standard information.

While each storage subsystem may include multiple disks 20, the shadow set members are chosen to be disks in different storage subsystems. Therefore, hosts do not access two shadow set members through the same disk controller. This will avoid a "central point of failure." In other words, if the shadow set members have a common or central controller, and that controller malfunctions, the hosts will not be able to successfully perform any I/O operations. In the preferred system, however, the shadow set members are "distributed", and the failure of one device (e.g., one disk controller 18) will not inhibit I/O operations because they can be performed using another shadow set member accessed through another disk controller.

When a host wishes to write data to the shadow set, the host issues a command whose format is illustrated in FIG. 2A. The command includes a "command reference number" field that uniquely identifies the command, and a "unit number" field that identifies the unit (e.g. the disk 20) to which data is to be written. The host issues a separate write command for each disk that makes up the shadow set, using the proper unit number. The opcode field identifies that the operation is a write. The "byte count" field gives the total number of bytes contained in the data to be written and the "logical block number" identifies the starting location on the disk. The "buffer descriptor" identifies the location in host memory 12 that contains the data to be written.

The format of a read command is illustrated in FIG. 2B, and includes fields that are similar to the write command fields. For a read command, the buffer descriptor contains the location in host memory 12 to which the data read from the disk is to be stored.

Once a host transmits a read or write command, it is received by the disk controller 18 that serves the disk identified in the "unit number" field. For a write command, the disk controller will implement the write to its disk 20 and return an "end message" to the originating host, the format of the write command end message being illustrated in FIG. 3A. The end message includes a status field that informs the host whether or not the command was completed successfully. If the write failed the status field can include error information, depending on the nature of the failure. The "first bad block" field indicates the address of a first block on the disk that is damaged (if any).

For a read command, the disk controller will read the requested data from its disk and transmit the data to memory 12 of the originating host. An end message is also generated by the disk controller after a read command and sent to the originating host, the format of the read command end message being illustrated in FIG. 3B. The read command end message is similar to the end message for the write command.

As will be explained below, the system utilizes a "Compare Host" operation when transferring data between two shadow set members. The command message format for the Compare Host operation is shown in FIG. 4A. The Compare Host operation instructs the disk controller supporting the disk identified in the "unit number" field to compare the data stored in a section of host memory identified in the "buffer descriptor" field, to the data stored on the disk in the location identified by the "logical block number" and "byte count" fields.

The disk controller receiving the Compare Host command will execute the requested operation by reading the identified data from host memory, reading the data from the identified section of the disk, and comparing the data read from the host to the data read from the disk. The disk controller then issues an end message, the format of which is shown in FIG. 4B, to the host that issued the Compare Host command. The status field of the end message will indicate whether the compared data was found to be identical.

When adding a new member to the shadow set (i.e., a new disk 20), the system chooses a host processor to carry out the processing necessary to provide the new member with all of the data stored in the active members of the shadow set. The host will choose one active member to function as a "source" and will sequentially copy all of the data from the source that differs from data in the new member, to the new member or "target." Using the method of the invention, data is transferred to the new member without interrupting normal I/O operations between other hosts and the shadow set, while assuring that any changes to data in the shadow set made during the copy operation will propagate to the new member.

Specifically, the method of transferring data to a new member or target from a source involves sequentially reading data blocks, a "cluster" at a time (a cluster is a predetermined number of data blocks), from the source and comparing the read data to data stored at corresponding locations in the target. If the data is identical in the two corresponding clusters, then the next cluster is processed. Otherwise, the data read from the source is written to the target, and the host performs a similar comparison operation on the same cluster once again. The second comparison on the same cluster of data is necessary because the shadow set is available for I/O operations to other hosts during the process of adding a new member. In other words, while the new member is being added, I/O operations such as write operations from hosts in the system will continue to the shadow set. Read commands are performed to any active member, but not to the target since not all of the target's data is identical to the shadow set data. Since it is possible for a write operation to occur after the system reads data from the source and before it writes the data to the target, it is possible that obsolete data will be written into the target. I.e., if the data in the shadow set is updated just before the host writes data to the target, the data written to the target will be obsolete.

Therefore, the system will perform a second compare operation after it writes data to the target, to the same two corresponding data clusters. In this way, if the source has been updated, and the target was inadvertently written with obsolete data, the second comparison will detect the difference and the write operation will be repeated to provide the updated data to the target. Only after the two clusters are found to have identical data does the process move to the next data cluster.

It is theoretically possible for the same cluster to be compared and written many times. For example, if there was a particularly oft-written file or data block that was being changed constantly, the source data cluster and target data cluster would always be inconsistent. To prevent the system from repeating the comparison and writing steps in an infinite loop, a "repeat cluster counter" is used to determine how many times the loop has been executed.

This counter is initialized to zero and is incremented after data is written from the source to the target. The counter is monitored to determine if it reaches a predetermined threshold number. The counter is reset when the system moves on to a new cluster. Therefore, if the same cluster is continually compared and written to the target, the counter will eventually reach the threshold value. The system will then reduce the size of the cluster and perform the comparison again. Reducing the size of the cluster will make it more likely that the clusters on the two members will be consistent since data in a smaller size cluster is less likely to be changed by a write from one of the hosts. When a successful comparison is eventually achieved, the cluster size is restored to its previous value.

As described above, I/O operations to the shadow set will continue while a new member is being added. However, hosts are required to perform write type operations in a manner that guarantees that while a a new member is being added, all data written to logical blocks on the target disk will be identical to those contained on the source disk. If hosts issue I/O commands in parallel, as is normally done, it is possible that the data on the source and target will not be consistent after the copy method described above is implemented. To avoid possible data corruption, hosts shall ensure that write operations addressed to the source disk are issued and completed before the equivalent operation is issued to the target disk.

As explained above, each host stores a table that lists data that the host needs to operate properly in the system. For example, each table will include information regarding the disks that make up the shadow set, etc. The table also stores status information that informs the host whether or not a new member is being added to the shadow set. Therefore, before a host executes an I/O request to the shadow set it will check the status field in its table, and if the host determines that a new member is being added, the host will implement the special procedures discussed above for avoiding possible data corruption. The table is kept current by requiring hosts that begin the process of adding a new member, to send a message to every other host in the system, informing each host of the operation. A host that is controlling the addition of the new member will not begin the data transfer to the new member until it receives a confirmation from each host that each host has updated its table to reflect the new status of the system. Similarly, a host controlling the addition of a new member will send a message to each host when the new member has been added, and has data that is consistent with the shadow set. Upon receiving this message, hosts will resume the normal practice of issuing I/O requests in parallel.

Figure 5A:
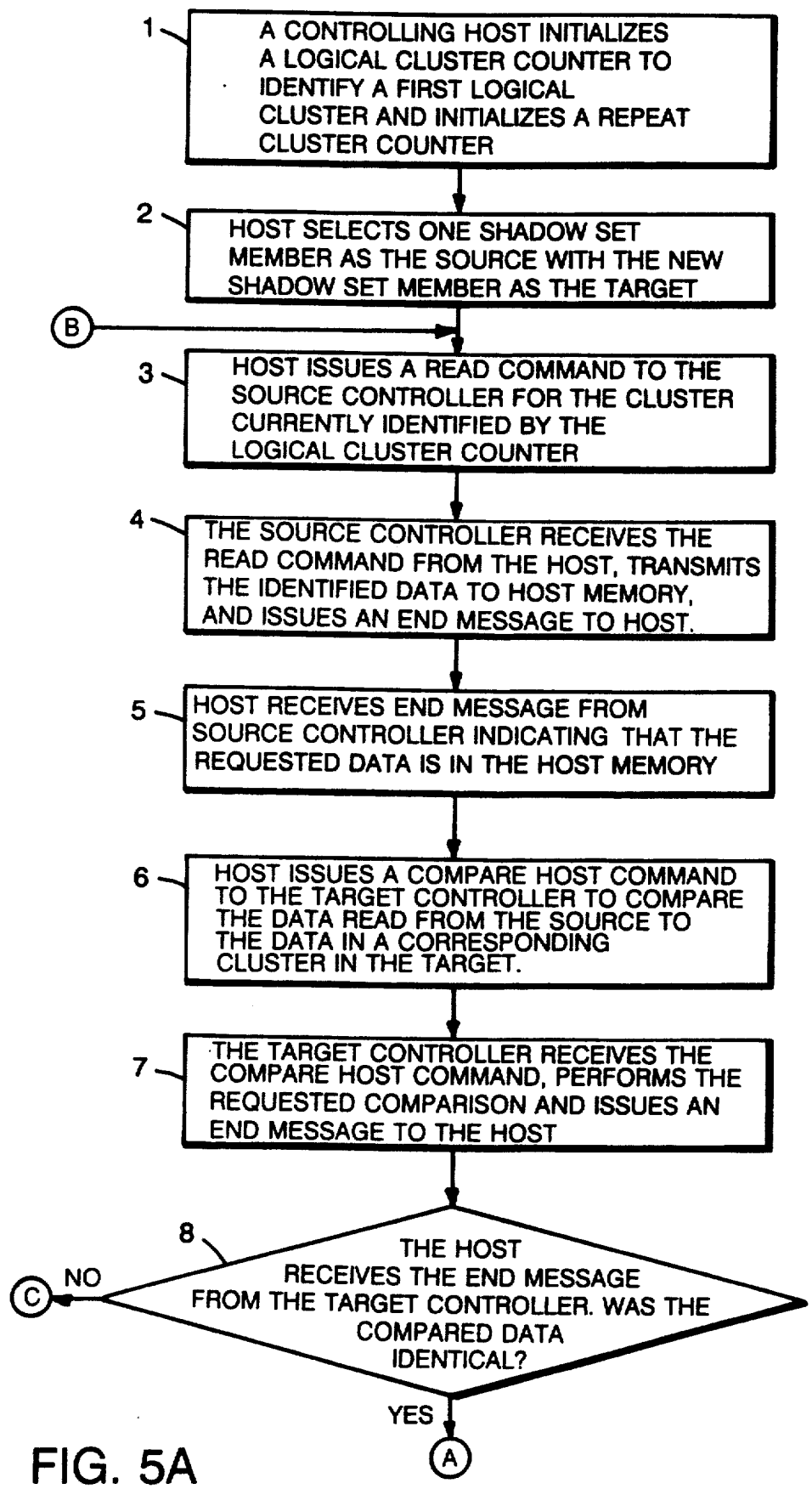
FIG. 5A-5B is a flow chart illustrating the method employed by the invention.
Figure 5B:
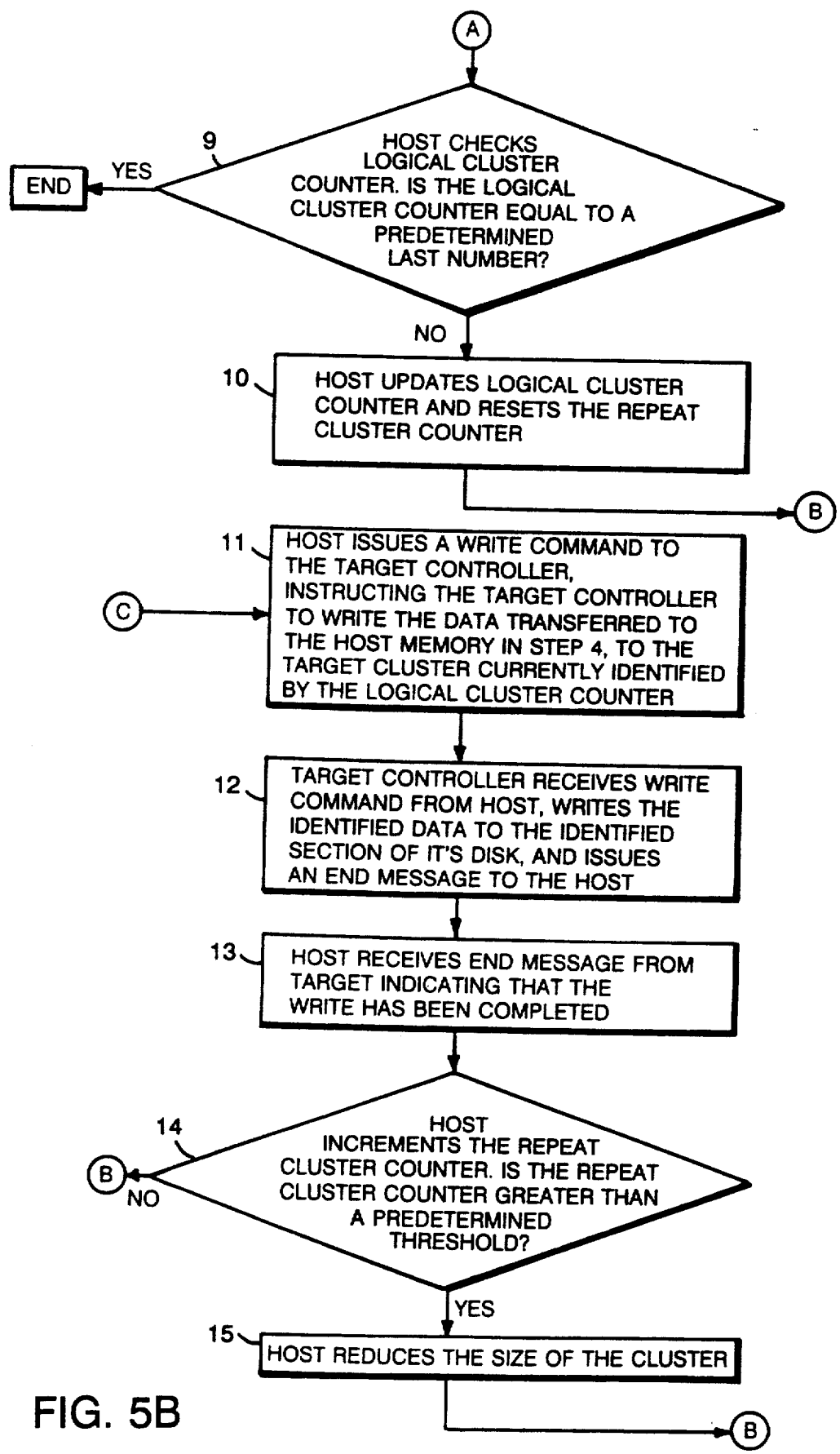

The method of the invention will now be explained in detail, with reference to the flow chart of FIG. 5. The host first initializes two counters: a "logical cluster counter" and the repeat cluster counter (step 1). The logical cluster counter is used to identify clusters in each shadow set member and, when initialized, will identify a first cluster of data. As the logical cluster counter is incremented, it sequentially identifies each cluster in the shadow set.

Next, the host selects one active shadow set member to serve as the source with the new member serving as the target (step 2). The host then issues a read command of the type illustrated in FIG. 2B to the disk controller serving the source (identified by the "unit number" field in the command) requesting that the data in the cluster identified by the logical cluster counter be read and transmitted to host memory (step 3).

The disk controller serving the source will receive the read command, will read the identified data from the source to its buffer 22 and will transmit the data to host memory 12, as well as issuing an end message (see FIG. 2B) informing the host that the read command was executed (step 4).

After the host receives the end message indicating that the data from the source is in host memory 12 (step 5), the host will issue a Compare Host command to the target to compare the data read from the source to the data stored in the same logical cluster in the target (step 6).

The target will receive the Compare Host command, and will perform the comparison, issuing an end message (see FIG. 4B) to the host indicating the result of the comparison (step 7).

The host receives the end message in step 8 and determines whether the data compared by the Compare Host command was identical. If the compared data was identical, then the logical cluster counter is tested to see if it is equal to a predetermined last number (indicating that all data clusters have been processed) (step 9). If the logical cluster counter is equal to the last number, then the process is finished. Otherwise, the logical cluster counter is incremented, the repeat cluster counter is reset (step 10), and the method returns to step 3 to begin processing the next cluster.

If the compared data was not identical (see step 8), the host issues a write command of the type shown in FIG. 2A, to the target's disk controller, instructing the controller to write the data read from the source and sent to the host in step 4 to the section of the target identified by the logical cluster counter (i.e., the cluster in the target that corresponds to the cluster in the source from which the data was read) (step 11).

The disk controller serving the target receives the write command, reads the data from host memory and writes it to the section of the target identified by the current logical cluster counter and issues an end message to the host (step 12).

The host receives the end message indicating that the write has been completed (step 13), increments the repeat cluster counter and determines if the repeat cluster counter is greater than a threshold value (step 14). As explained above, if the same cluster is written a predetermined number of times, the repeat cluster counter will reach a certain value and the size of the cluster is reduced (step 15).

The system then returns to step 3 without updating the logical cluster counter. Since the logical cluster counter is not updated, the host will then read the same cluster once again from the source and perform the host compare operation to the target for the same cluster.

The above described embodiment is a preferred illustrative embodiment only and there are various modifications that may be made within the spirit of the invention. For example, the method may be modified such that, if a new disk being added to the shadow set is known to have little or no data that is consistent with data on the active members of the shadow set, steps 6–10 can be eliminated the first time that each cluster is processed such that no Compare Host operation is performed. In other words, if the new disk is known to contain data that is different than the data stored in the shadow set, the result of the first Compare Host operation will be negative and need not be performed. However, if the new disk being added was one that was in the shadow set in the recent past, then most of its data will be consistent with the data in the shadow set, and the Compare Host operation should be performed the first time.

Therefore, the invention shall be limited only by the scope of the appended claims.

We claim:

1. A method of transferring data between a first storage medium and a second storage medium, at least said first storage medium being accessible to one or more host processors for I/O operations that include writing data to said first storage medium, each of said storage media including data blocks with at least some data blocks of said first storage medium having corresponding data blocks in said second storage medium, said method comprising the steps of:
   (a) reading data stored in a first data block in said first storage medium, the first data block initially constituting a current data block;
   (b) comparing the data read in said current data block to data stored in a corresponding data block in said second storage medium;
   (c) if the data compared in step b are identical, reading data stored in another data block in said first storage medium, said another data block becoming the current data block, and returning to step b;
   (d) if the data compared in step b are not identical, modifying the data stored in one of said storage media by transferring data between said storage media to cause the data in said current data block and the data in said corresponding data block in said second storage medium to be identical while maintaining access to said first storage medium for said I/O operations by said one or more of said host processors; and
   (e) rereading the data in said current data block and returning to step b.

2. The method of claim 1 wherein said step of modifying comprises modifying the data in said second storage medium.

3. The method of claim 2 wherein said step of modifying comprises writing said data read from the current data block in said first storage medium to the corresponding data block in said second storage medium.

4. The method of claim 1 wherein said different data block is a data block adjacent to said current data block.

5. The method of claim 1 wherein each data block in said first storage medium is compared to a corresponding data block in said second storage medium.

6. The method of claim 1 wherein each of said storage media are members of a shadow set of storage media.

7. The method of claim 6 wherein each of said storage media may be directly accessed by a host processor.

8. The method of claim 6 wherein each of said storage media may be directly accessed by each of a plurality of host processors.

9. The method of claim 1 wherein said storage media are disk storage devices.

10. A method of managing a shadow set of storage media that are accessible by one or more host processors for I/O operations that include writing data thereto, each one of said storage media having storage locations at least some of which correspond to storage locations of another one of said storage media, the method comprising the steps of:
   A. carrying out successive comparisons of data stored in said corresponding locations of said plurality of said storage media, respectively; and
   B. performing a management operation on at least one of said storage media, said management operation comprising, for each of said corresponding locations where said comparisons indicated that the data in said corresponding locations were not identical;
      a. reading data from locations in a first one of said storage media and writing said data to said corresponding locations a second one of said storage media while maintaining access to at least said first storage medium for said I/O operations by said one or more of said host processors;
      b. comparing the data in said corresponding locations after said writing to determine if the data in said corresponding locations are identical; and
      c. repeating step a if the comparison of step b indicates that the data in said corresponding locations are not identical, otherwise terminating said management operation as to said storage locations.

11. An apparatus for managing a shadow set of storage media accessible by one or more host processors for I/O operations that include writing data thereto, each one of said storage media having storage locations at least some of which correspond to storage locations of another one of said storage media, comprising:
   means for carrying out successive comparisons of data stored in said corresponding locations of said plurality of said storage media, respectively; and
   means, responsive to said comparisons, for performing a management operation on at least one of said storage media, said management operation comprising, for each of said corresponding locations where said comparisons indicated that the data in said corresponding locations were not identical;
      a. reading data from locations in a first one of said storage media and writing said data to said corresponding locations in a second one of said storage media while maintaining access to at least said first storage medium for said I/O operations by said one or more of said host processors;

b. comparing the data in said corresponding locations after said writing to determine if the data in said corresponding locations are identical; and c. repeating step a if the comparison of step b indicates that the data in said corresponding locations are not identical, otherwise terminating said management operation as to said storage locations.

12. The method of claim 1 wherein each of said host processors will transmit any write requests to said storage media first to said first storage medium and, after said write request to said first storage medium has completed, will transmit said write request to said second storage medium.

13. The method of claim 1 wherein each of said host processors maintains a table including information that enables said host processor to determine if said data transfers are occurring between said of storage media.

14. The method of claim 10 wherein each of said storage media may be directly accessed by each of a plurality of host processors.

15. The method of claim 10 wherein each of said host processors will transmit any write requests to said storage media first to said one of said storage media and, after said write request to said one of said storage media has completed, will transmit said write request to said another of said storage media.

16. The method of claim 10 wherein each of said host processors maintains a table including information that enables said host processor to determine whether said management operation is being performed on one or more of said storage media in said shadow set.

17. The method of claim 10 wherein step B(b) comprises rereading said data from said locations in said one of said storage media and comparing said reread data to data in said corresponding locations in said another of said storage media.

18. The method of claim 10 wherein steps B(a) and B(b) are repeated recursively for the same corresponding locations until the data stored in said corresponding locations is determined to be identical.

19. The apparatus of claim 11 wherein each of said host processors will transmit any write requests to said storage media first to said one of said storage media and, after said write request to said one of said storage media has completed, will transmit said write request to said another of said storage media.

20. The apparatus of claim 11 wherein each of said host processors maintains a table including information that enables said host processor to determine whether said management operation is being performed on one or more of said storage media in said shadow set.

21. The apparatus of claim 11 wherein each of said storage media may be directly accessed by each of a plurality of host processors.

22. The apparatus of claim 11 wherein said management operation comprises rereading said data from said locations in said one of said storage media after said writing and comparing said reread data to data in said corresponding locations in said another of said storage media.

23. The apparatus of claim 11 wherein said means for performing said management operation repeats said reading and comparing recursively for the same corresponding locations until the data stored in said corresponding locations is determined to be identical.

* * * * *

UNITED STATES PATENT AND TRADEMARK OFFICE
CERTIFICATE OF CORRECTION

PATENT NO. : 5,210,865
DATED : May 11, 1993
INVENTOR(S) : Scott H. Davis, et al.

It is certified that error appears in the above-indentified patent and that said Letters Patent is hereby corrected as shown below:

Column 1, line 14, "374,353" should be --374,253--.

Column 3, line 15, start new paragraph at "Each".

Column 7, line 13, "enbodiment" should be --embodiment--.

Signed and Sealed this

Nineteenth Day of September, 1995

Attest:

BRUCE LEHMAN

Attesting Officer

Commissioner of Patents and Trademarks